United States Patent
Grosser, Jr. et al.

(10) Patent No.: US 9,385,942 B2
(45) Date of Patent: *Jul. 5, 2016

(54) METHODS, SYSTEMS, AND COMPUTER READABLE MEDIA FOR PROVIDING N-NODE MULTI-SWITCH LINK AGGREGATION GROUPS (MLAGS)

(71) Applicant: Extreme Networks, Inc., San Jose, CA (US)

(72) Inventors: Donald B. Grosser, Jr., Apex, NC (US); Shankara Ramamurthy, Chennai (IN)

(73) Assignee: Extreme Networks, Inc., San Jose, CA (US)

(*) Notice: Subject to any disclaimer, the term of this patent is extended or adjusted under 35 U.S.C. 154(b) by 44 days.

This patent is subject to a terminal disclaimer.

(21) Appl. No.: 14/266,784

(22) Filed: Apr. 30, 2014

(65) Prior Publication Data

US 2015/0319083 A1    Nov. 5, 2015

(51) Int. Cl.
*H04L 12/28*     (2006.01)
*H04L 12/709*    (2013.01)
*H04L 12/24*     (2006.01)

(52) U.S. Cl.
CPC .......... *H04L 45/245* (2013.01); *H04L 41/0668* (2013.01); *H04L 41/0672* (2013.01); *H04L 41/12* (2013.01)

(58) Field of Classification Search
None
See application file for complete search history.

(56) References Cited

U.S. PATENT DOCUMENTS

| 7,173,934 B2 | 2/2007 | Lapuh et al. | |
| 8,730,963 B1* | 5/2014 | Grosser et al. | 370/392 |
| 2007/0294417 A1* | 12/2007 | Ikudome et al. | 709/229 |
| 2008/0112323 A1 | 5/2008 | Agmon et al. | |
| 2012/0054850 A1 | 3/2012 | Bhardwaj et al. | |
| 2013/0194914 A1* | 8/2013 | Agarwal et al. | 370/225 |
| 2014/0201297 A1* | 7/2014 | Schmidt et al. | 709/206 |

OTHER PUBLICATIONS

Supplemental Notice of Allowability for U.S. Appl. No. 12/977,771 (Mar. 14, 2014).
Notice of Allowance and Fee(s) Due for U.S. Appl. No. 12/977,771 (Jan. 6, 2014).
Interview Summary for U.S. Appl. No. 12/977,771 (Jul. 9, 2013).
Final Official Action for U.S. Appl. No. 12/977,771 (Mar. 15, 2013).
Non-Final Official Action for U.S. Appl. No. 12/977,771 (Nov. 2, 2012).

(Continued)

*Primary Examiner* — Chi H Pham
*Assistant Examiner* — Shick Hom
(74) *Attorney, Agent, or Firm* — Ropes & Gray LLP

(57) ABSTRACT

A system for providing at least one node of an n-node multi-switch link aggregation group (MLAG) includes a packet forwarding device for receiving a packet destined for at least one n-node MLAG, n being an integer greater than 2. The packet forwarding device includes a packet forwarding database for storing packet forwarding rules for the at least one n-node MLAG. The packet forwarding device further includes a processing element for forwarding, blocking forwarding of, or redirecting the packet in accordance with one of the packet forwarding rules defined for the n-node MLAG group in the packet forwarding database.

29 Claims, 10 Drawing Sheets

(56) References Cited

OTHER PUBLICATIONS

"Split Multi-link Trunking," Wikipedia online, p. 1-4 (Downloaded from the Internet Nov. 10, 2010).

Commonly-assigned, co-pending U.S. Appl. No. 14/975,094 for "Methods, Systems, and Computer Readable Media for Advanced Disribution in a Link Aggregation Group," (Unpublished, filed Dec. 18, 2015).

* cited by examiner

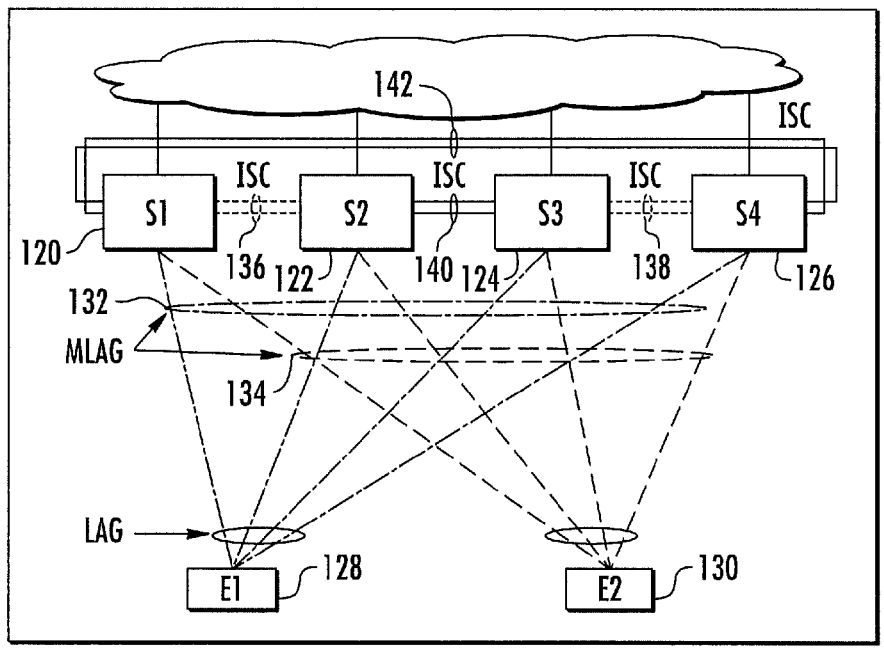
*FIG. 5*
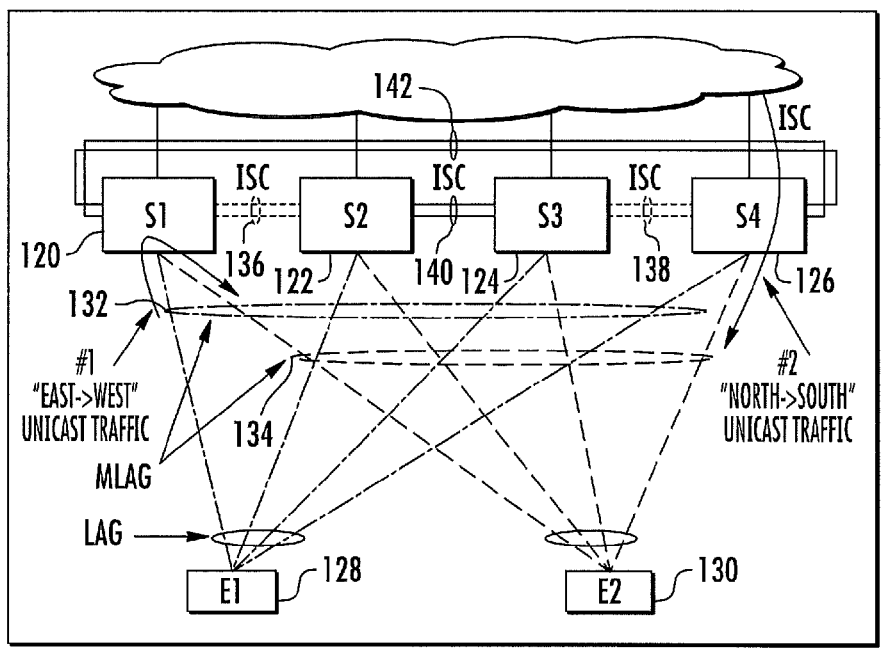
*FIG. 6*

METHODS, SYSTEMS, AND COMPUTER READABLE MEDIA FOR PROVIDING N-NODE MULTI-SWITCH LINK AGGREGATION GROUPS (MLAGS)

TECHNICAL FIELD

The subject matter described herein relates to packet forwarding devices. More particularly, the subject matter described herein relates to providing n-node MLAGs, where n is an integer greater than 2.

BACKGROUND

A network, such as an Internet protocol (IP)-based network, may have redundant links or connections between nodes. For example, a server may be connected via redundant links to multiple routers or switches. While nodes may be redundantly connected via multiple links, network configuration may prevent the multiple links from being used at the same time. For example, in a local area network (LAN), packets may be forwarded by a layer 2 packet forwarding device. To prevent loops and packet duplication, an appropriate layer 2 protocol, such as spanning tree protocol (STP), may be used to create a loop-free topology. For example, STP may be used to create a spanning tree within a network of connected layer 2 packet forwarding devices. In particular, STP may block redundant links such that only a single active path between any two network nodes is used for forwarding packets.

While STP and similar protocols prevent loops and loop-related problems, the redundant links are effectively dormant unless a currently active link fails or becomes inactive, at which time the redundant link may become active. Thus, for a network where every node is connected to every other node by two or more links, STP and similar protocols typically may result in an inefficient use of available resources (e.g., available network bandwidth) due to loop preventing blocking.

One solution to prevent this inefficient use of available resources is to use additional connections and link layer logic in the network that allows more than one active link between two nodes to be utilized. For example, multiple physical links on one device that are connected to the same second device can be treated as a single logical connection in which all of the links can be simultaneously utilized. One layer 2 methodology in which multiple physical links between two devices are treated as a single logical connection where all of the links can be simultaneously utilized is referred to as link aggregation. The collection of links that form a single logical connection between two devices is referred herein to as a link aggregation group (LAG). Defining a LAG allows multiple redundant physical links between the same 2 nodes to be used without requiring STP blocking because each LAG member implements forwarding rules to prevent packet duplication and looping.

One layer 2 methodology in which multiple physical links associated with different switches that are treated as a single logical connection is referred to as multi-switch link aggregation. The collection of links associated with different switches that form a single logical connection is referred to herein as a multi-switch link aggregation group (MLAG). Physical ports on switches or routers that are members of the same LAG or MLAG are referred to herein as peer LAG or MLAG ports. Like LAGs, MLAGs allow redundant connections to be fully utilized without requiring STP blocking by implementing forwarding rules that prevent packet duplication and looping.

Currently, 2-node MLAGs provide for efficient use of network resources by allowing ports on different switches to be treated as part of the same MLAG. However, it is desirable to extend MLAGs beyond 2-node MLAGs. Extending MLAGs beyond 2-node groups increases the complexity of MLAG packet forwarding rules, especially when one or more links associated with an MLAG fail.

Accordingly, in light of these difficulties, there exists a need for improved methods, systems, and computer readable media for n-node MLAGs.

SUMMARY

A system for providing at least one node of an n-node multi-switch link aggregation group (MLAG) includes a packet forwarding device for receiving a packet destined for an n-node MLAG, n being an integer greater than two. The n-node MLAG includes an n-node packet forwarding database for storing packet forwarding rules for the at least one n-node MLAG. The packet forwarding device further includes a processing element for forwarding, blocking forwarding of, or redirecting the packet in accordance with the packet forwarding rules defined for the n-node MLAG group in the n-node MLAG enabled packet forwarding database.

The subject matter described herein can be implemented using a non-transitory computer readable medium having stored thereon executable instructions that when executed by the processor of a computer control the computer to perform steps. Exemplary computer readable media for implementing the subject matter described herein may include chip memory devices, disk memory devices, programmable logical devices, and application specific integrated circuits. In addition, a computer readable medium that implements the subject matter described herein may be located on a single device or computing platform or may be distributed across plural devices or computing platforms.

BRIEF DESCRIPTION OF THE DRAWINGS

Preferred embodiments of the subject matter described herein will now be described with reference to the accompanying drawings of which:

FIG. 5 is a block diagram illustrating 4-node MLAGs according to an embodiment of the subject matter described herein;

FIG. 6 is a block diagram illustrating unicast traffic flows in steady state for 4-node MLAGs according to an embodiment of the subject matter described herein;

DETAILED DESCRIPTION

Figure 1:
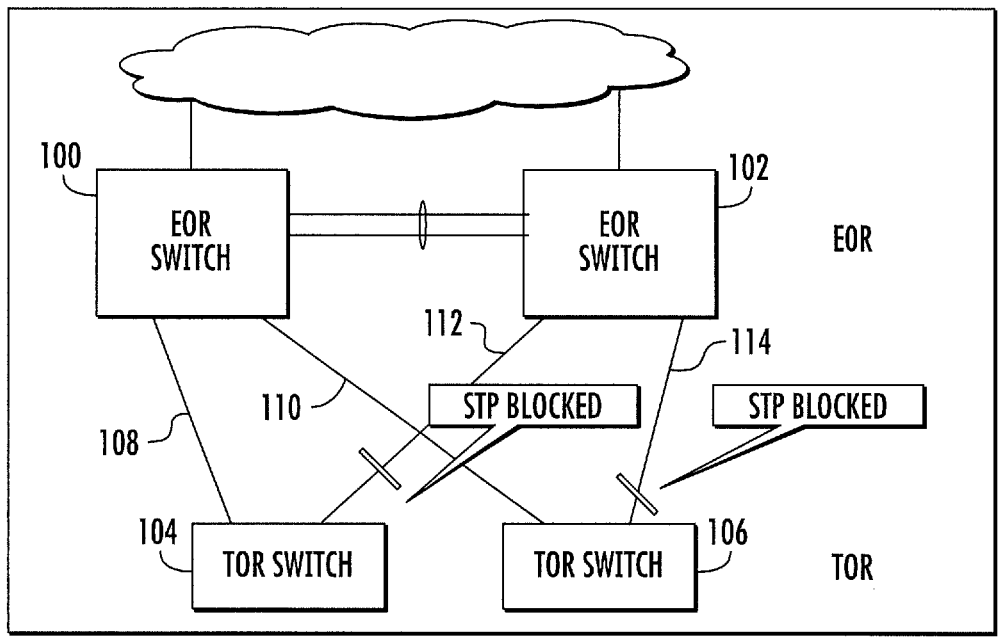
FIG. 1 is a block diagram illustrating a legacy data center network design.

Methods, systems, and computer readable for n-node MLAGs according to an embodiment of the subject matter described herein. FIG. 1 is a block diagram illustrating a conventional data center switch design where redundant links are block by spanning tree protocol blocking. In particular, the combination of redundant connections from Top of Rack (TOR) switches to End of Row (EOR) switches and L2 protocols such as Spanning Tree Protocol (STP) result in a loss of half of the available bandwidth due to STP blocking. The designation as EOR switches and TOR switches refers to exemplary placement of switches in a rack. However, MLAGs as described herein are not limited to EOR or TOR switches. These switch placements are shown for illustrative purposes, as EOR switches are likely to be connected to other switches or devices in the cloud, and TOR switches are likely to be connected to end nodes where packet duplication could occur. Without MLAGs, STP blocking would be implemented between EOR and TOR switches to prevent packet duplication from the EOR switches to the nodes connected to TOR switches and vice versa.

In FIG. 1, TOR switches 104 and 106 may each be connected redundantly to EOR switches 102 and 104 via links 108, 110, 112, and 114. However, rather than utilizing the total bandwidth provided by all 4 links, 2 of the links are blocked by STP blocking to prevent packet duplication and a network loop (which may result in a broadcast storm) at nodes connected to TOR switches 104 and 106.

Figure 2:
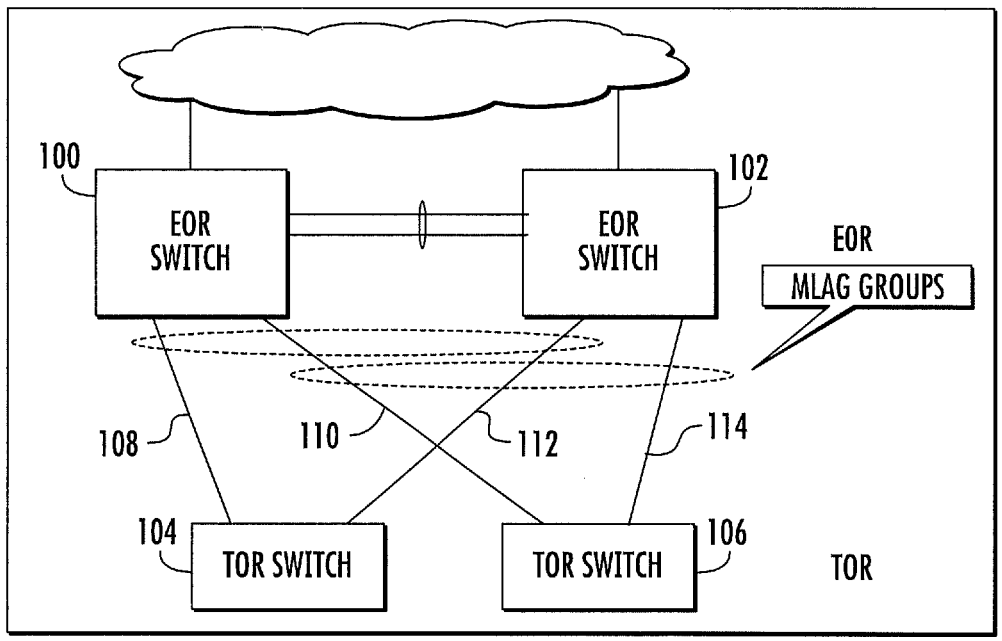
FIG. 2 is a block diagram illustrating the data center network design of FIG. 1 with 2-node MLAGs.

In order to alleviate the need for STP blocking, multi-switch link aggregation allows users to combine physical ports across 2 different switches into a single logical connection thus removing network loops and the need for STP blocking. FIG. 2 illustrates the use of MLAGs to optimize link utilization and eliminate STP blocking. In FIG. 2, EOR switches 100 and 102 are connected to TOR switches 104 and 106 using links 108, 110, 112, and 114, as illustrated in FIG. 1. Links 108 and 112 are configured as a first MLAG, and links 110 and 114 are configured as a second MLAG. It should be noted that the ports on EOR switches 102 and 104 connected to links 108, 110, 112, and 114 are configured as MLAG ports, whereas for switches 104 and 106 are configured such that their corresponding ports connected to these links are LAG ports. Because the links in each MLAG are treated as a single logical connection, both links can be used, and the need for STP blocking to prevent packet duplication is eliminated.

Figure 3:
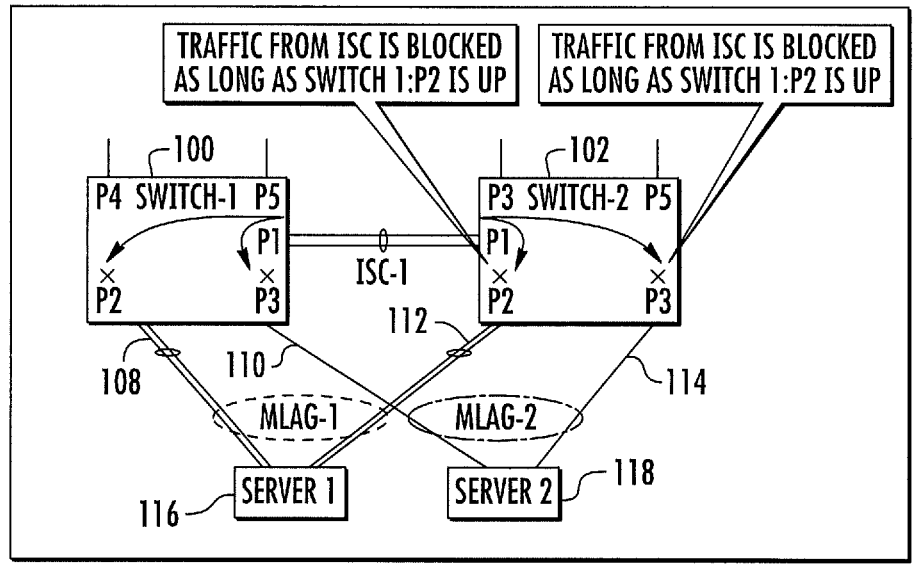
FIG. 3 is a block diagram illustrating MLAG blocking during steady state.

The multi-switch link aggregation feature, by using certain interconnection assumptions, optimizes bandwidth utilization by blocking only traffic required to create network loops and duplicated traffic. The basic assumption made by the feature is that ports connected within a single MLAG group across 2 switches are connected to the same device (server or switch) or are connected to another set of networking devices provisioned with a matching and opposite MLAG configuration. By making such an assumption, all available bandwidth can be used while still providing layer-2 redundancy. While in steady state, when all MLAG peer ports are active, all traffic destined to the MLAG group is switched locally within the receiving MLAG node. Any traffic also traversing the inter-switch connection (ISC) is assumed to have already been forwarded to the peer MLAG port and subject to the ISC blocking filters as illustrated in FIG. 3. In FIG. 3, ports P2 of switches 100 and 102 are assumed to be part of the same MLAG. Similarly, ports P3 and P4 on switches 100 and 102 are assumed to be part of another MLAG. Switches 100 and 102 are connected to servers 116 and 118, which are assumed to be end nodes. In steady state operation, traffic on inter-switch connection ISC-1 is blocked as long as the MLAG ports on the switch from which the traffic originates is operational.

Figure 4:
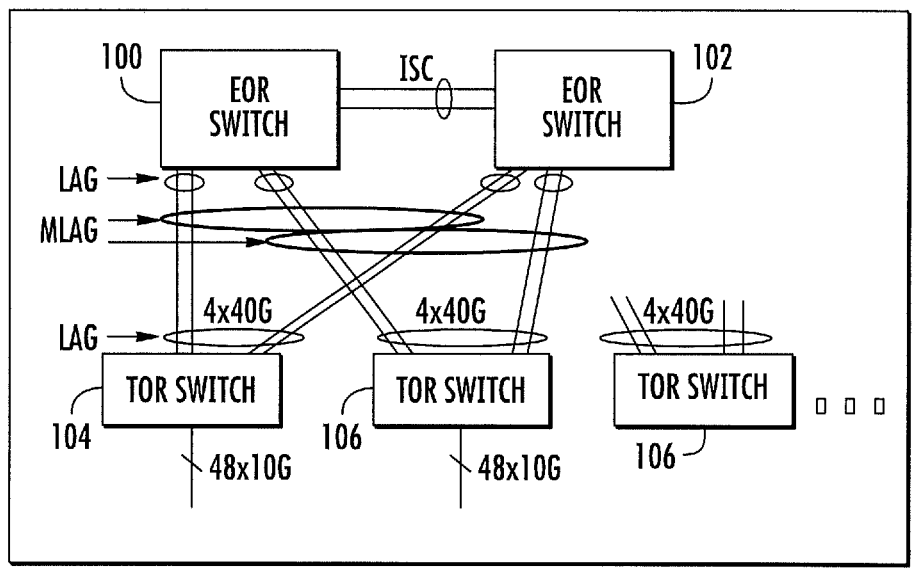
FIG. 4 is a block diagram illustrating 2-node MLAG with LAGs of 2 ports for each node.

When an MLAG port fails on one of the 2 switches, traffic convergence steps are as follows:
1.) Unblock traffic from the ISC and destined to the peer MLAG port
2.) Converge traffic (2 alternatives):
  a. Via forwarding database (FDB):
    i. Delete MAC FDB entries that were previously added to direct traffic to the failed MLAG port
    ii. Move or re-learn the MAC FDB entries that were previously directing traffic to the failed MLAG port to redirect this traffic to the ISC
  b. Via access control list (ACL) or other database or function redirection:
    i. Leave MAC FDBs associated with failed MLAG port intact
    ii. Use access control list (ACL) or other database or function to match dest=failed port+action redirect to ISC In current MLAG implementations, the limit of the number of MLAG nodes in an MLAG is 2. This limitation creates an upper bound on the number of ports that can be part of the non-blocking "MLAG fabric" in a 2-tier network design. When a server or downstream TOR switch has more than 2 ports that need to be combined into a single logical bundle, the 2 MLAG nodes each provide a LAG of n ports as the MLAG port as illustrated in FIG. 4. In FIG. 4, switches 100 and 102 are redundantly connected to switches 104 and 106 using two MLAGs, each of which include 4 LAG ports. Additional switches, such as switch 106 can be connected to different 2-node MLAGs but not the same MLAGs as switches 100 and 102.

Using the technique illustrated in FIG. 4 as it applies to switches available from Extreme Networks, Inc., the link capacities of which are illustrated in FIG. 4, one can achieve a non-blocking MLAG "network element" of approximately 4600×10G ports. This is calculated by connecting each 48×10G layer 2 switch 104 and 106 via 4×40G ports to a pair of switches 100 and 102. Since each switch 100 and 102 has a capacity of 192×40G ports and some number of these ports are required for the ISC, less than 96 48×10G switches can be accommodated, making the total number of 10G ports (96× 48=4608).

Other technologies are capable of providing 4-way (or more) equal cost paths. For example, transparent interconnection of lots of links (TRILL), shortest path bridging (SPB), and layer-3 equal cost multi-path routing (ECMP) routes can provide this functionality. However, each of these has a limitation or complexity which does not exist in MLAG. Given the proliferation of 2-node MLAG topologies, there is a strong need to extend current MLAG offerings to increase overall capacity and provide a higher level of resiliency while still positioning the solution as an evolutionary upgrade step and not a complete replacement of existing hardware.

The subject matter described herein includes methods, systems, and computer readable media for providing an n-node MLAG, where n is an integer greater than 2. FIG. 5 is a block diagram illustrating an exemplary system for providing a 4-node MLAG according to an embodiment of the subject matter described herein. Referring to FIG. 5, switches 120, 122, 124, and 126 are connected to edge switches 128 and 130 using 2 different 4-port, 4-node MLAGs 132 and 134. Switches 120 and 122 are connected to each other using green interswitch connection 136. Similarly, switches 124 and 126 are connected to each other using green interswitch connection 138. Switches 122 and 124 are connected to each other using red interswitch connection 140, and switches 120 and 126 are connected to each other using red interswitch connection 142. The terms "green" and "red" are used herein for reference only to designate interswitch connections between different switches. Similarly, "blue" and "yellow" are used to differentiate between MLAGs 132 and 134. To avoid the need for color drawings, the various colors in FIGS. 5-15 are shown by different types of dashed lines, as indicated by the legend in FIGS. 5-15.

In FIG. 5, each edge switch 128 and 130 provides a 4-port LAG with a single port to each MLAG switch 120, 122, 124, and 126. Unlike traditional 2-node MLAG, each MLAG switch is connected to 2 ISCs, one is green and one is red. The ISCs and MLAG switches form a ring. The subject matter described herein is not limited to providing an n-node MLAG using the ring topology illustrated in FIG. 5.

In an alternate implementation, the 4-node MLAG may be provided without interswitch connection 142 such that the switches are connected together in a linear or serial array. Such a topology would be less reliable than the topology illustrated in FIG. 5. However, a linear topology would still fully utilize all links of the MLAG groups provided that the interswitch connections are available.

As with 2-node MLAG, each MLAG port in a 4-node MLAG can either be a singleton port or a LAG itself for increased bandwidth and resiliency. Using 4-node MLAG, as it applies to switches available from the Extreme Networks, Inc., a non-blocking MLAG "network element" can be created with approximately 9200×10G ports, 2 times more than with 2-node MLAG.

There are 2 forwarding rules for 4-node MLAG in steady state, when all MLAG ports and ISCs are operational, as follows:
1.) L2 traffic received on an ISC is blocked from being transmitted to an MLAG port
2.) L2 traffic received on a red ISC is blocked from being transmitted to a green ISC Each node knows the status of MLAG ports and nodes using a protocol.

These rules facilitate one of the advantages of MLAG: local switching of unicast traffic. FIG. 6 illustrates steady-state switching in a 4-node MLAG for 2 unicast traffic flows. Traffic flow #1 demonstrates local switching of the so-called "East to West" traffic. This is traffic forwarded between the 2 MLAG groups 132 and 134. Traffic flow #2 demonstrates local switching of the so-called "North to South" traffic. This is the traffic forwarded from a non-MLAG port on switch S4 126 to an MLAG group 134.

Figure 7:
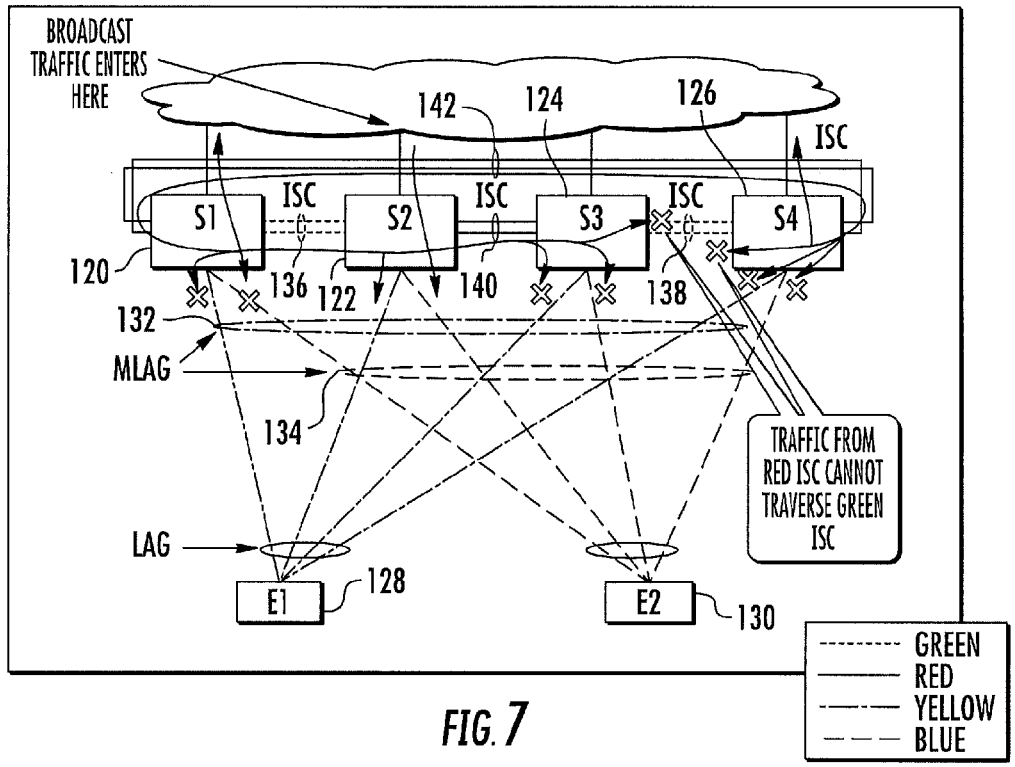
FIG. 7 is a block diagram illustrating broadcast traffic flows in steady state for 4-node MLAGs according to an embodiment of the subject matter described herein.

In steady state, broadcast, unknown unicast, and multicast (BUM) traffic follows the same rules. This traffic is locally switched to all available MLAG ports and then is flooded around the ISC ring to facilitate connectivity between MLAG ports and non-MLAG ports or MLAG ports in various failure states. When this traffic is flooded around the ISC ring, traffic received on a red ISC will be blocked from being transmitted to a green ISC to prevent a network loop. FIG. 7 illustrates "North to South" broadcast traffic entering the MLAG system at node S2 122. Traffic is locally switched from S2 122 to both the yellow and blue MLAG ports and is flooded to both the red ISC and the green ISC. When this traffic reaches nodes S1 120, S3 124, and S4 126, it is blocked from transmission on local MLAG ports. Furthermore, ISC-to-ISC flooding is blocked on nodes S3 124 and S4 126 as it is received on the respective red ISC and cannot be forwarded to the green ISC.

Upon experiencing a single MLAG port failure, the rules change slightly as follows:
1.) Changed: L2 traffic received on an ISC is blocked from being transmitted to an MLAG port, except traffic received on the green ISC of the node adjacent to the failure is unblocked.
2.) Unchanged: L2 traffic received on a red ISC is blocked from being transmitted to a green ISC.
3.) Added: Unicast traffic destined for the failed MLAG port is redirected to the node's green ISC. As with 2-node MLAG, redirection can happen either via the MAC FDB or via an ACL or other database or function redirection.

Figure 8:
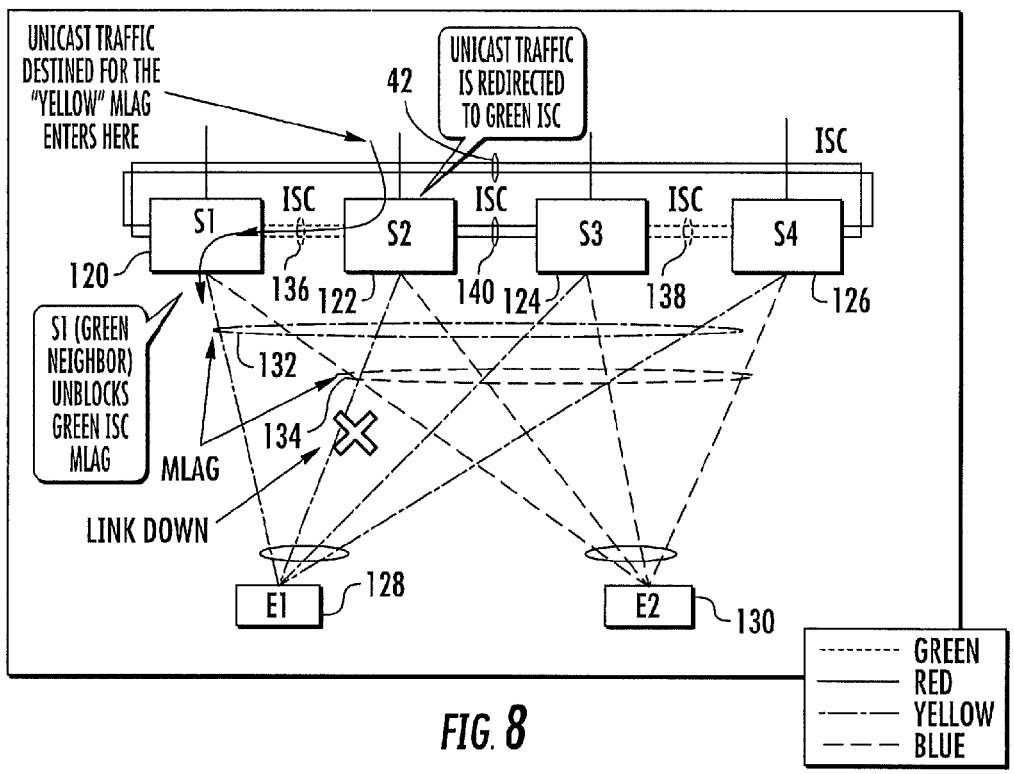
FIG. 8 is a block diagram illustrating traffic flows in 4-node MLAGs after a single MLAG port failure according to an embodiment of the subject matter described herein.

FIG. 8 illustrates a "north to south" L2 unicast packet flow arriving on S2 122 and destined for the "yellow" MLAG 132. Since the S2 MLAG port associated with the "yellow" MLAG 132 is down, traffic is redirected to S2's green ISC 136. The redirection may occur via the MAC FDB, via a redirection rule provisioned in the ACL, via a rule configured in a table stored in memory separate from the MAC FDB or the ACL, or via a logic-implemented redirection function separate from the MAC FDB and the ACL. Then, based on the above rules, adjacent node S1 120 unblocks traffic received on its green ISC 136 to allow transmission to its "yellow" MLAG port.

Figure 9:
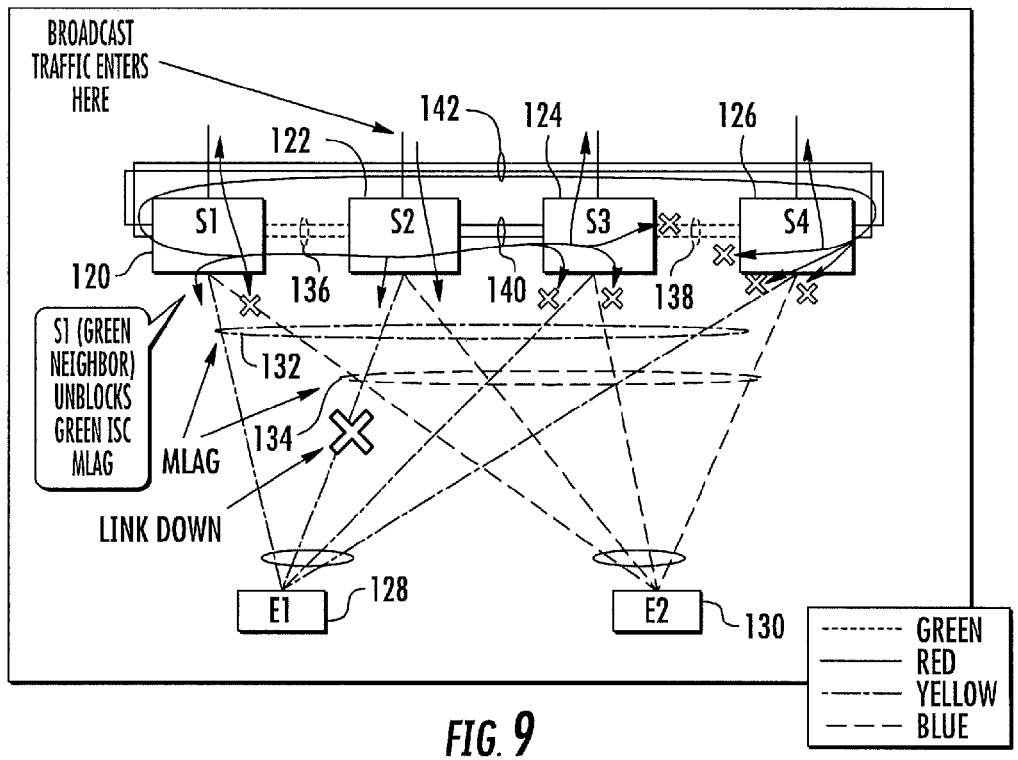
FIG. 9 is a block diagram illustrating broadcast traffic flows in 4-node MLAGs after a single MLAG port failure according to an embodiment of the subject matter described herein.

FIG. 9 illustrates "North to South" BUM traffic flow with a single MLAG port failure on node S2 122. The broadcast traffic enters on S2 122 and is flooded to both ISCs 136 and 140 and the local "blue" MLAG port. The local "yellow" MLAG port is down. When this traffic received on the red ISC 140 of S3 124 and the red ISC 142 of S4 126, it is blocked from being forwarded to the green ISC 138, preventing a network loop. Since the single MLAG failure rules are being used, the adjacent S1 node's green ISC 136 is unblocked for transmission to its "yellow" MLAG port. Otherwise, all ISC-to-MLAG forwarding is blocked due to MLAG rules. While Sts green ISC-to-MLAG forwarding is unblocked, Sts red ISC-to-MLAG forwarding remains blocked. This way only that traffic which enters on S2 122, the node with the failure, is able to utilize the newly unblocked path.

It is important to note that the above description of handling a single MLAG failure remains the same for the case where there are multiple MLAG port failures but only a single failure per group.

Figure 10:
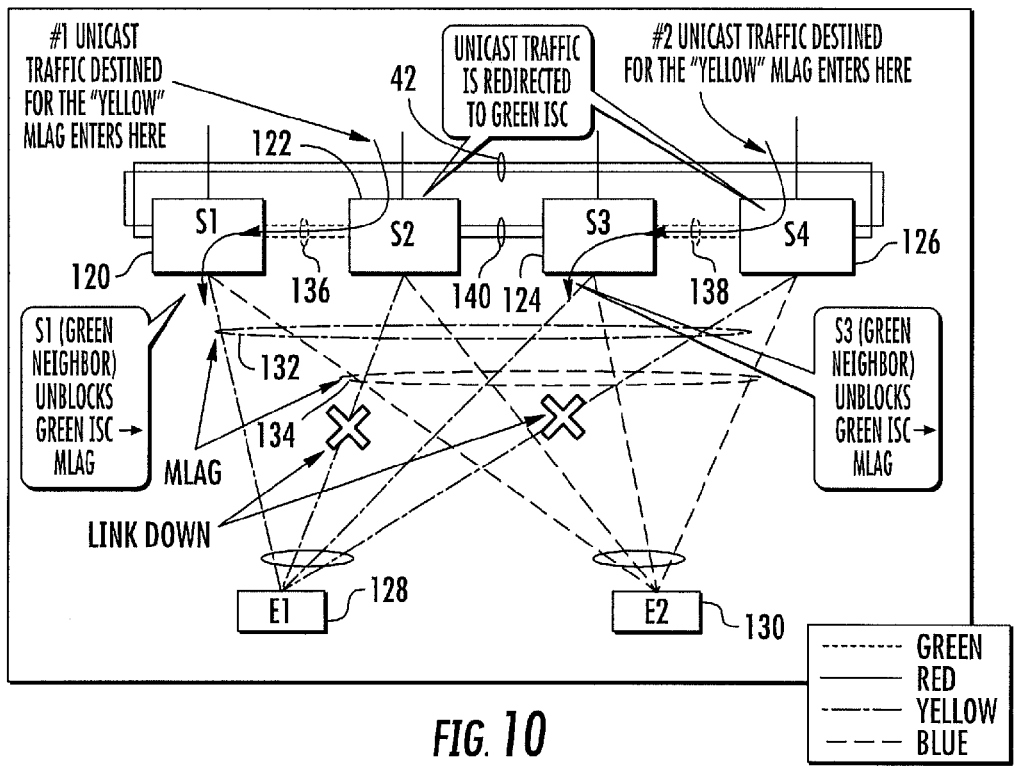
FIG. 10 is a block diagram illustrating unicast traffic flows after 2 non-adjacent MLAG port failures in a single MLAG group according to an embodiment of the subject matter described herein.

When there are 2 failures within a single MLAG group and the failures are not on adjacent nodes, the blocking rules remain the same as those used and described above for a single failure. The primary difference is that multiple green-ISC-to-MLAG ports are unblocked. FIG. 10 illustrates 2 unicast traffic flows in this scenario.

BUM traffic in this case again follows the same rules as the single MLAG port failure case illustrated in FIG. 9. "North to South" BUM traffic entering on S2 122 would be flooded to the local "blue" MLAG port and both the green and red ISCs 136 and 140. S3 124 would receive this traffic over its red ISC 140 and block transmission on both "yellow" and "blue" MLAG ports as well as its green ISC. S1 120 would receive this traffic over its green ISC 136, would block transmission to its "blue" MLAG port, and would allow transmission to its "yellow" MLAG port and red ISC 142. S4 126 would receive this traffic and block transmission to its MLAG ports as well as is green ISC 138, preventing the network loop.

When 2 MLAG failures happen on the same MLAG group and occur on adjacent nodes, the rules are as follows:
1.) Changed: L2 traffic received on an ISC is blocked from being transmitted to an MLAG port, except traffic received on the selected red ISC of the node adjacent to the failure is unblocked.
2.) Unchanged: L2 traffic received on a red ISC is blocked from being transmitted to a green ISC.
3.) Added: Unicast traffic destined for the failed MLAG port is redirected to the node's red ISC if the adjacent node's red ISC is selected for unblocking. Otherwise, this unicast traffic is redirected to the green ISC. As with 2-node MLAG, redirection can happen either via the MAC FDB, via an ACL redirection, or via redirection implemented separately from the MAC FDB or the ACL.

Figure 11:
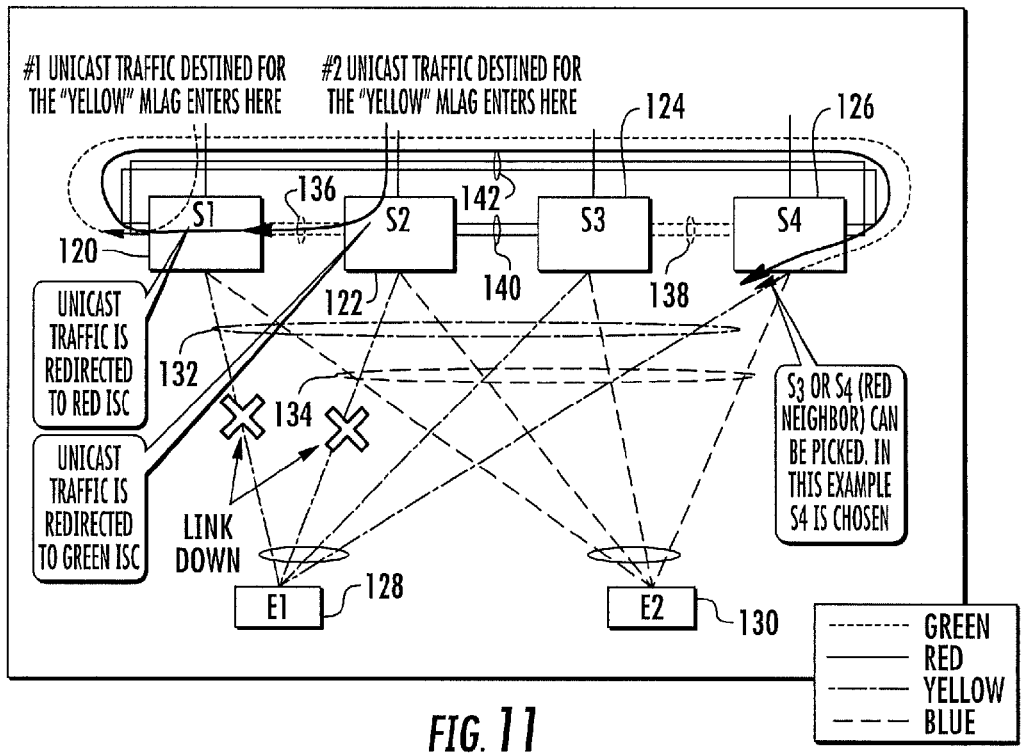
FIG. 11 is a block diagram illustrating unicast traffic flows after 2 adjacent MLAG port failures according to an embodiment of the subject matter described herein.

FIG. 11 illustrates 2 MLAG failures in the same "yellow" MLAG group which occur on adjacent nodes.

Figure 12:
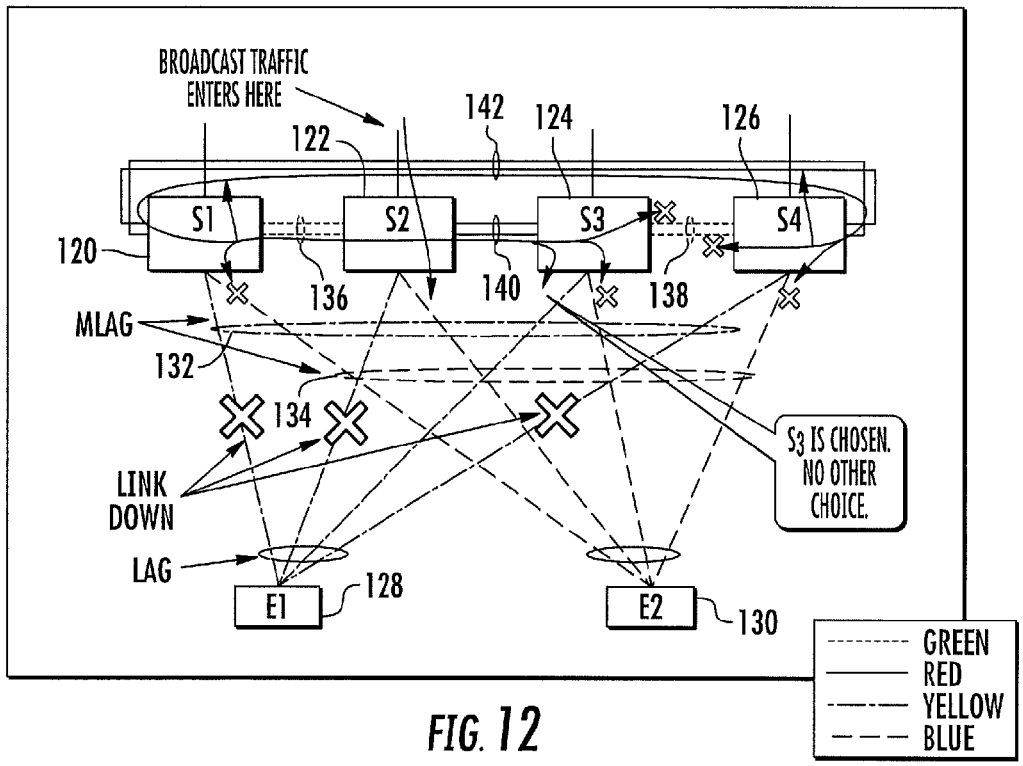
FIG. 12 is a block diagram illustrating broadcast and unknown unicast traffic after 3 MLAG port failures according to an embodiment of the subject matter described herein.

When 3 failures occur on the same MLAG, the final red-ISC-to-MLAG connection is unblocked. FIG. 12 illustrates BUM traffic with 3 concurrent failures. In this case, the "yellow" MLAG ports from S1 120, S2 122, and S4 126 are down. Since the S3 red ISC to MLAG port connection is the only choice, it is unblocked for transmission.

Figure 13:
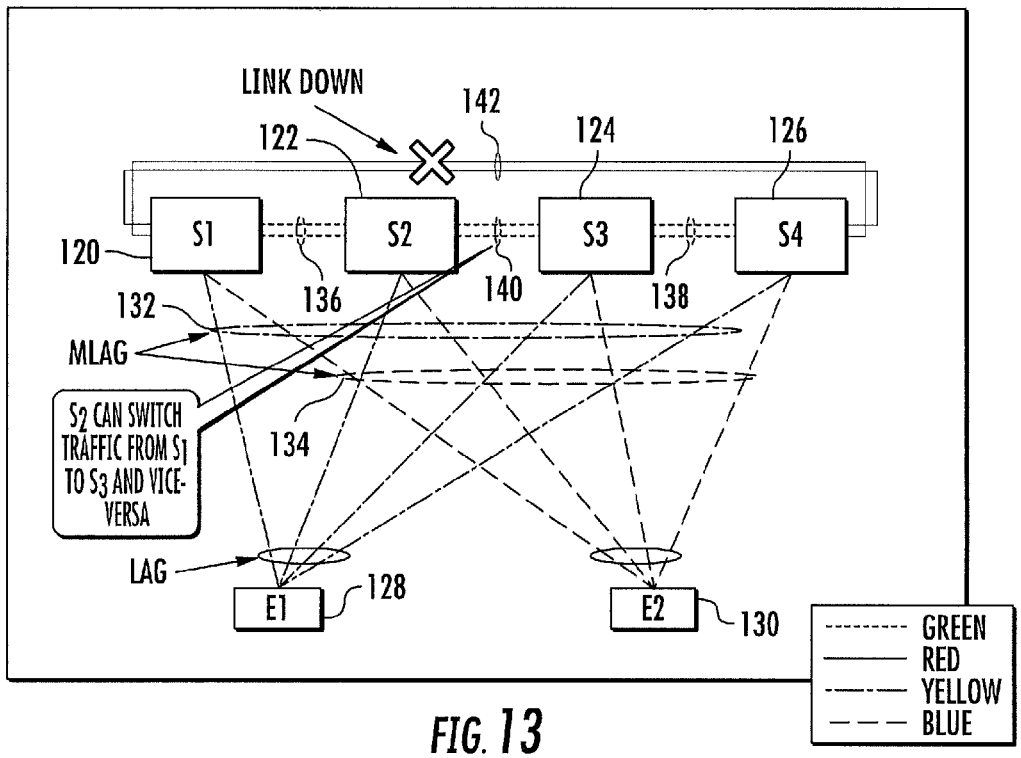
FIG. 13 is a block diagram illustrating traffic flows in 4-node MLAGs after a single interswitch connection failure according to an embodiment of the subject matter described herein.

When one ISC fails without any MLAG failures, MLAG rules are unchanged and all remaining ISCs are changed to green. FIG. 13 illustrates an ISC failure from S1 120 to S4 126. In this case, the ISC between S2 122 and S3 124, which was previously red, is turned green, permitting traffic flow between S1 and S4. All MLAG traffic is locally switched and ISC-to-MLAG traffic is blocked.

Figure 14:
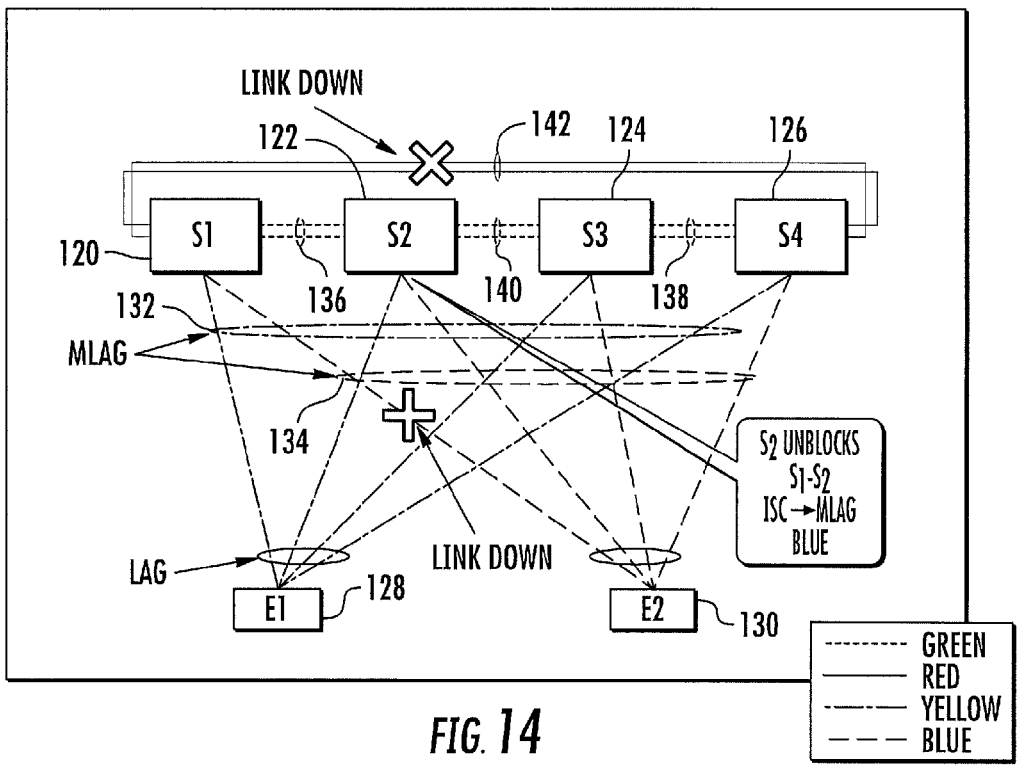
FIG. 14 is a block diagram illustrating traffic flows in 4-node MLAGs after a single interswitch connection failure and an outer node MLAG port failure according to an embodiment of the subject matter described herein.
Figure 15:
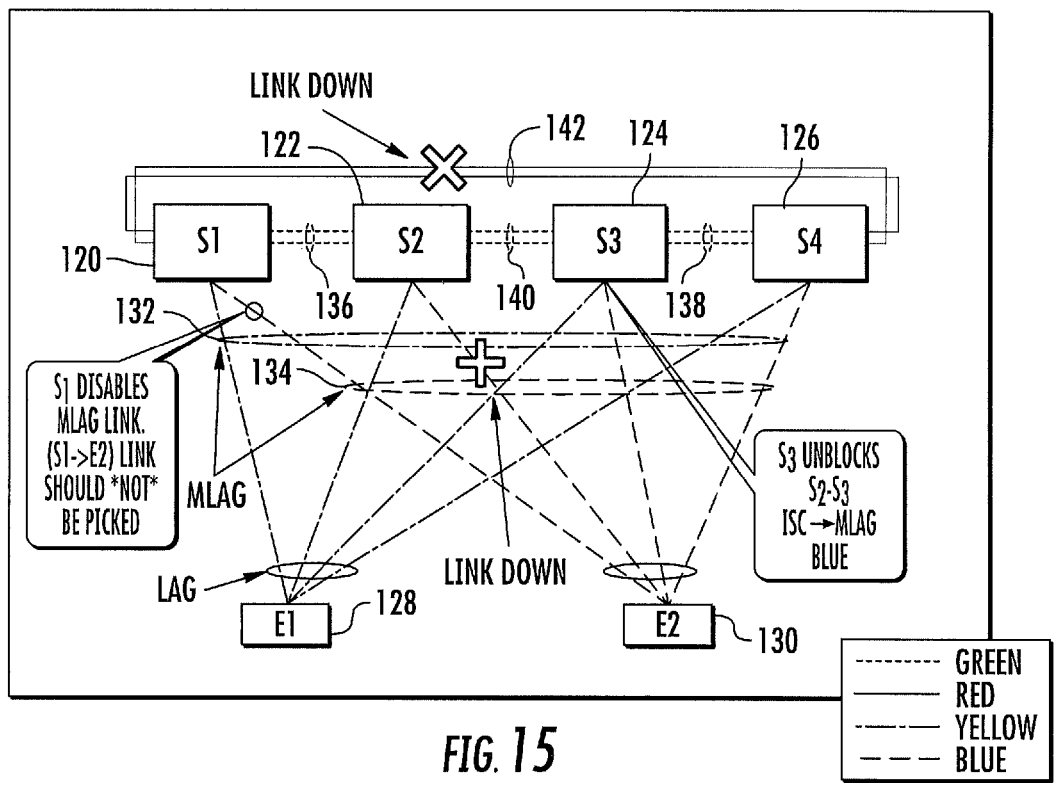
FIG. 15 is block diagram illustrating traffic flows in 4-node MLAGs after a single interswitch connection failure and an inner node MLAG port failure according to an embodiment of the subject matter described herein.

When a single ISC failure occurs the ring topology of MLAG switches becomes a linear topology, and MLAG failures are handled differently depending on whether they occur on an outer node or an inner node. The designations outer and inner nodes are given to MLAG switches which are either connected to the failed ISC or not connected to the failed ISC respectively. In FIGS. 14 and 15, nodes S1 120 and S4 126 are outer nodes, and nodes S2 122 and S3 124 are inner nodes. When the MLAG failure occurs on an outer node, the adjacent node unblocks the ISC-to-MLAG port to facilitate communication with the group. No other action is taken beyond that which was described above for the ISC failure. FIG. 14 illustrates a single ISC failure with a single MLAG failure on an outer node. In this case, the MLAG failure occurs to the "blue" MLAG on S1.

When the MLAG failure occurs on an inner node, there is an additional action performed. In this case, the adjacent "outer" node, disables is corresponding MLAG port and the entire group is reduced to 50% bandwidth, instead of the expected 75% with a single failure. FIG. 15 illustrates a single MLAG failure on inner node S2 122 on the "blue" MLAG. Due to this MLAG failure, adjacent outer node S1 120 disables its corresponding "blue" MLAG port.

When a single ISC is down, single MLAG node failures are handled much the same as the ISC failure scenarios described above. When a node fails, all of the other active ISCs turn green. If additional MLAG failures occur at this time, they are handled differently depending on whether they occur on an outer node, one adjacent to the downed node, or on an inner node, one not adjacent to the downed node. When the MLAG failure occurs on an outer node, the adjacent inner node blocks its corresponding MLAG port and the MLAG group operates at 50% (1 MLAG port down due to MLAG failure+1 MLAG port down due to node failure). However, when the MLAG failure occurs on the inner node, one of the adjacent outer nodes disables its corresponding MLAG port and the MLAG group operates at 25% (1 MLAG port down due to MLAG failure+1 MLAG port down due to node failure+1 MLAG port down due to the previously mentioned disable operation). The reason for blocking an MLAG port when a single ISC is down and there is a failure on an adjacent MLAG node or port is to avoid broadcast storms.

As stated above, the subject matter described herein for providing n-node MLAGs includes operational scenarios where the switches that form the n-node MLAG are connected to each other via interswitch connections in a ring topology, as illustrated in FIGS. 5-12 or a linear topology, as illustrated in FIGS. 14 and 15 when a single ISC fails. It should be noted a linear topology is not limited to the single ISC failure case. For example, the switches that form the n-node MLAG may intentionally be connected to each other in a linear topology without the additional interswitch connection that forms a ring. In such a case, the packet forwarding rules would be those described above in for the single ISC failure case.

Figure 16:
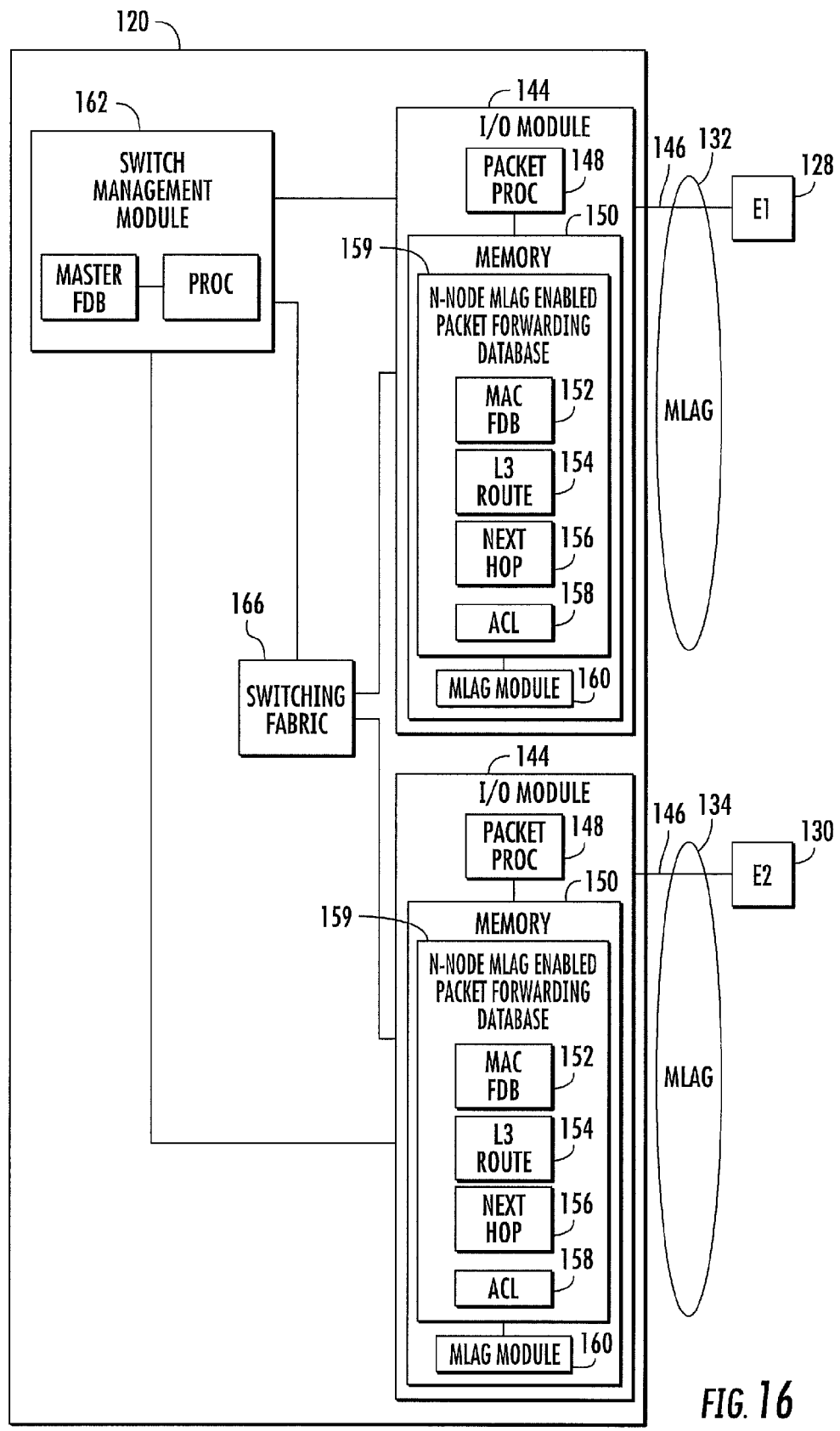
FIG. 16 is a block diagram illustrating an exemplary packet forwarding device for implementing the functionality of a single node of an n-node MLAG according to an embodiment of the subject matter described herein.

FIG. 16 is a block diagram illustrating an exemplary packet forwarding device for implementing the functionality of a single node of an n-node MLAG according to an embodiment of the subject matter described herein. Referring to FIG. 16, packet forwarding device 120 may have layer 2 switching and layer 3 packet forwarding capabilities, where layers 2 and 3 refer to the corresponding layers in the open systems interconnect (OSI) protocol stack. Thus, packet forwarding device may include Ethernet and other datalink switching and IP and other routing protocol functionality.

Packet forwarding device 120 includes a plurality of input/output (I/O) modules 144, each having at least one port 146 for communicating packets to and receiving packets from connected hosts, such as servers, personal computers, etc., or switches and routers, etc. In the illustrated example, packet forwarding device includes two I/O modules with two ports, respectively connected to MLAGs 132 and 134. It is understood that packet forwarding device may include more or fewer than two I/O modules and more than two ports without departing from the scope of the subject matter described herein. For example, packet forwarding device 120 may also include I/O modules and ports for interswitch connections and other non-MLAG connections. In an alternate implementation, packet forwarding device 120 may be a stackable device with a single network interface type used both for MLAG and ISC connections.

In the illustrated example, each I/O module 144 includes a processing element, which in the illustrated example is a packet processor 148, and a memory 150. Each packet processor 148 performs packet forwarding operations using packet forwarding information stored in its respective memory 150, including information in the received packet. In one embodiment, packet processor 148 may perform one or more packet forwarding lookups and apply n-node MLAG packet forwarding rules, if applicable.

The term "processing element" as used herein may include a code controlled entity, such as a microprocessor that executes code stored in memory or a gate array (field programmable or integrated circuit) that implements the indicated functions via hardware, state machines or other well know mechanisms. In addition, a processing element may include a single processing entity, such as single microprocessor or gate array, or multiple microprocessors or gate arrays. A processing element may include a single processor core or multiple processor cores. A processing element may be the same entity that receives packets at a port or may be a centralized element that operates on packets received by another processing element at the port.

In the illustrated example, each memory 150 includes a MAC forwarding database 152 for storing layer 2 packet forwarding information, a layer 3 longest prefix match or host route table 154 for storing layer 3 packet forwarding information, and a next hop table 156 for storing egress port, MAC address, and VLAN information. The combination of layer 3 route table 154 and next hop table 156 stores ARP bindings. Each memory 150 may also include ACL 158 that can be used to implement MLAG redirection rules and non-MLAG access control rules.

Because memory 150 implements packet forwarding rules for n-node MLAGs, the databases in memory 150 can be considered an n-node MLAG enabled packet forwarding database 159. N-node MLAG enabled packet forwarding database 159 refers to the collection of MLAG packet forwarding, blocking, and/or redirection rules that may be stored in memory 150. As stated above, the MLAG packet forwarding rules can be implemented in MAC forwarding database 152, redirection filters in access control list (ACL) 158, and/or in a redirection function that is separate from MAC forwarding database 152 and ACL 158. Each memory 150 also includes an MLAG module 160. MLAG module 160 may perform one or more MLAG related functions. For example, MLAG module 160 may be responsible for configuration of packet forwarding rules within a packet forwarding device to implement an MLAG 132 or 134. To implement packet forwarding rules for an MLAG, each MLAG module 160 may be aware of the topology of the MLAG and may update the packet forwarding rules in its respective packet forwarding device based on the device's relative position in the MLAG. MLAG module 160 may be also be responsible for handling MLAG traffic, e.g., redirecting and forwarding packets associated with MLAG ports.

In one embodiment, MLAG module 160 may use one or more methods for determining whether an ISC port, an MLAG port, an MLAG link or an MLAG node is active or inactive. For example, MLAG module 160 may initiate keep-alive messages and/or control packets for performing MLAG configuration and maintenance. MLAG module 160 may also maintain and update MLAG forwarding rules stored in MLAG enabled packet forwarding database 159. MLAG enabled packet forwarding rules database 159 may store the MLAG forwarding rules that implement the MLAG forwarding, blocking, and unblocking operations described above with respect to FIGS. 5-15. In one exemplary implementation, the MLAG forwarding rules may be stored in MAC forwarding database. MLAG module 160 may utilize the rules to determine how to forward received packets and may update the rules in response to link failures, node failures, link reactivations and node reactivations.

MLAG module 160 may also initiate and/or perform one or more steps of a convergence operation. For example, MLAG module 160 may generate or initiate another module (e.g., a switch management module 162 or) to generate and/or install a redirection filter. MLAG module 160 may redirect, using a redirection filter, the received packet towards an active port associated with the MLAG group. MLAG module 160 may also initiate and/or perform one or more steps of a failback operation. For example, MLAG module 160 uninstall a redirection filter in response to a reverting event. In an alternate implementation, MLAG module 160 may perform the convergence operation by installing the appropriate rules in MAC forwarding databases 152.

Packet forwarding device 120 also includes a switch fabric 166 that is responsible for forwarding packets between I/O modules 144 and between I/O modules 144 and switch management module 162. Switch management module 162 controls the overall operation of packet forwarding device 120. In one embodiment, switch management module 162 may provide information for MLAG and ACL related functions. For example, switch management module 162 may generate or construct a redirection filter for redirecting MLAG traffic. In one embodiment, switch management module 162 may provide a redirection filter to one or more I/O modules, e.g., a redirection filter to each I/O module 144. In addition, switch management module 162 may participate in IP routing protocols to populate layer 3 route tables 154 and may perform slowpath forwarding lookups for packets for which entries are not populated in layer 3 route tables 154.

Figure 17:
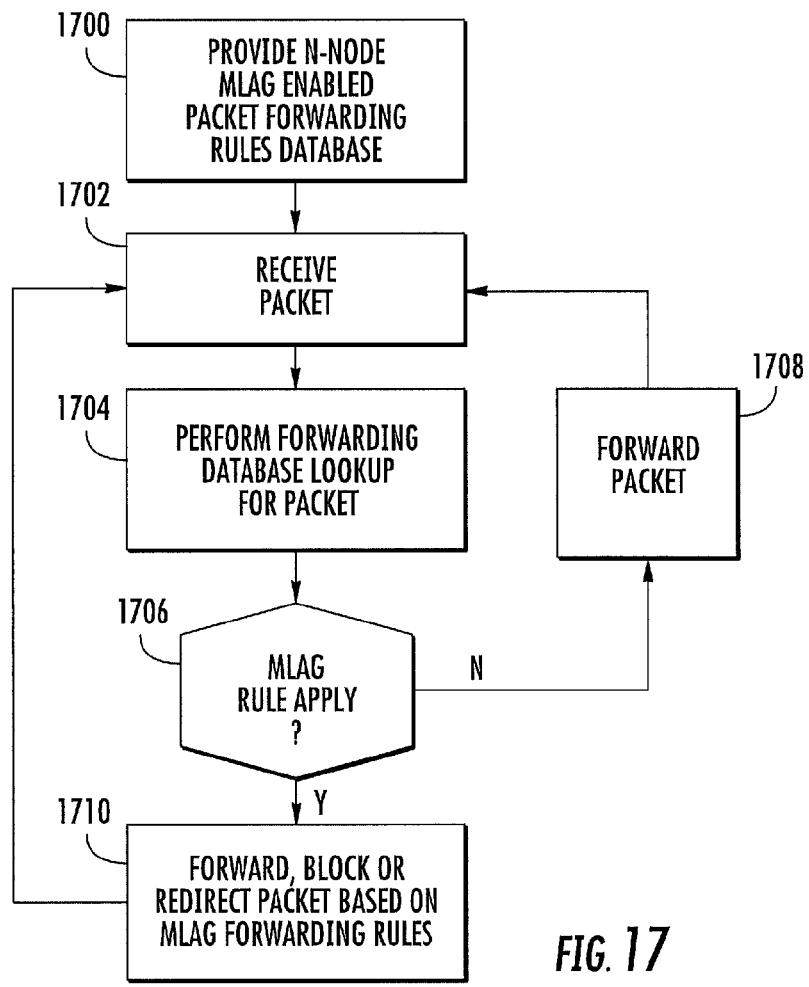
FIG. 17 is a flow chart illustrating an exemplary packet forwarding process for a packet forwarding device implementing the functionality of a single node of an n-node MLAG according to an embodiment of the subject matter described herein.

FIG. 17 is a flow chart illustrating an exemplary process for packet forwarding in a packet forwarding device implementing the functionality of a single node of an n-node MLAG according to an embodiment of the subject matter described herein. Referring to FIG. 17, in step 1700, an n-node MLAG packet forwarding rules database is provided, where n is greater than 2. As illustrated in FIG. 16, MLAG forwarding rules database 159 may be provided in packet forwarding device 120. In database 159, MLAG ports may be designated via user configuration. Each MLAG port may be configured with an identifier which is then used by each MLAG module 160 to associate ports on different nodes that are within the same MLAG group. MLAG peer nodes are configured via their IP addresses and the underlying ISC port/LAG is determined within each MLAG group. A topology discovery phase may be used for each node to learn the ISC topology (e.g. ring, string, or unsupported topology). In the topology discovery phase, if it is determined that the nodes are connected in a ring topology, ISCs will be designated with labels green, red, green, etc., in an alternating fashion starting with a specific node. In one exemplary implementation, the node with the lowest IP address may initiate the process of labeling connections as red or green.

In step 1702, a packet is received. The packet may be a layer 2 frame received by one of the I/O modules 144 illustrated in FIG. 16. In step 1704, a forwarding database lookups are performed for the packet. The forwarding database lookup may be a lookup in MAC forwarding database 152, layer 3 route table 154, and/or next hop table 156. In step 1706, it is determined whether any MLAG forwarding rules apply. Step 1706 may be determined as part of the forwarding database lookups if the MLAG forwarding rules are provisioned in MAC forwarding database 152. Alternatively, if the MAC forwarding rules are part of an ACL or a stand-alone redirection filter, determining whether any MLAG forwarding rules apply may be a separate step from the forwarding database lookup. If no MLAG forwarding rules apply, control proceeds to step 1708 where the packet is forwarded and then to step 1702 where the next packet is received.

If MLAG forwarding rules apply, control proceeds to step 1710, where the packet is forwarded, blocked, or redirected based on MLAG forwarding rules. After step 1710, control returns to step 1702 where the next packet is forwarded. Examples of rules that may be installed and utilized in various situations are described above with regard to FIGS. 5-15.

Figure 18:
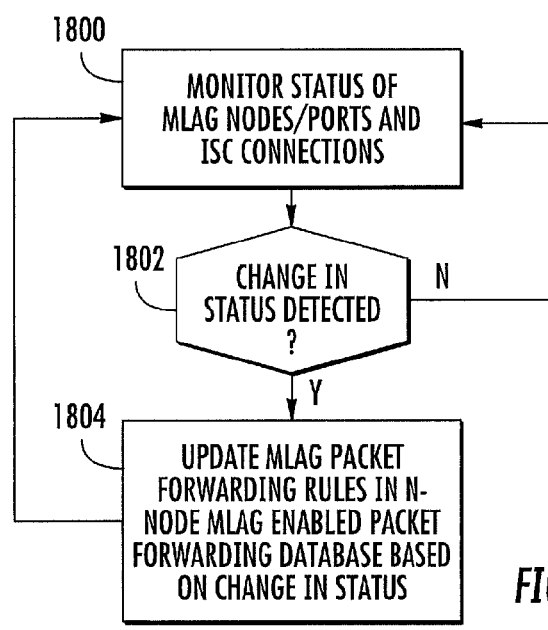
FIG. 18 is a flow chart illustrating an exemplary MLAG rules updating process of a packet forwarding device implementing the functionality of a single node of an n-node MLAG according to an embodiment of the subject matter described herein.

FIG. 18 is a flow chart illustrating an exemplary process for updating MLAG packet forwarding rules of a packet forwarding device implementing the functionality of a single node of an n-node MLAG according to an embodiment of the subject matter described herein. Referring to FIG. 18 in step 1800, the status of MLAG nodes, ports, and interswitch connections is monitored. Such monitoring may be performed by MLAG modules 160 or switch management module 162. In an MLAG, each switch may monitor its own ports and may communicate with other MLAG switches to 1) keep the other switches updated with the status of its ports and 2) determine the status of the other switches' ports. In step 1802, if a change in status is detected, control proceeds to step 1804 where MLAG packet forwarding rules in the MLAG enabled packet forwarding database are updated based on the change in status. Examples of rule update operations are described above with respect to FIGS. 5-15. In step 1802, if a change in status is not detected, control returns to step 1800 where the status of MLAG ports, nodes, and ISC connections is continually monitored. Also, in step 1804, after the MLAG packet forwarding rules have been updated, control returns to step 1800 where the status of MLAG nodes and ports and ISC connections is monitored for changes in status. The monitoring step may be performed continually.

To summarize, packet processing and MLAG forwarding rules implemented by a switch or packet forwarding device connected to an n-node MLAG may be as follows:

Packet Processing Rules: When a Packet is Received on a Switch:
1. The switch consults its forwarding database based on the MAC destination address (DA) and the VLAN to determine which port this packet needs to be forwarded to. If the DA is a non-unicast address, skip to step #3.
2. If there exists an entry in the database, the packet is forwarded to the port that is the result of the lookup. (Note: This may be overridden by a redirect ACL in hardware if the resulting port is a failed MLAG port and ACL redirection is enabled)
3. Else:
   a. If the ingress port is a Green ISC, transmit the packet to all ports in the VLAN including (Green and Red) ISC ports except the port on which the packet was received
   b. If the ingress port is a Red ISC, transmit the packet to all ports in the VLAN except all ISC ports and the port on which it was received Port Failure Rules:
When a local port fails on a switch:
4. If the failed port is a MLAG port, the switch checks to see if there is at least one MLAG group port on its directly connected peers that is active. "Active" here implies the port is up and not blocked.
   a. If both directly connected peers have their MLAG group ports active:
      i. If this switch is connected to one peer with a Green ISC and the other with a Red ISC, the peer that is reachable through the Green ISC is "chosen" (FIG. 9)
      ii. If the switch is connected to both peers by a Green ISC then
         1. If only one of the peers has its other ISC (not the ISC that is connected to this node) active, that peer gets chosen.
         2. If both peers have their other ISC active or both peers have their other ISC inactive, a peer is chosen using tie-breaking criteria. The tie breaking can be any suitable rule for differentiating between the peers, such as the lower peer's MAC address or ISC IP address. As long as the tie breaking criteria is consistent on all switches, the MLAG should function correctly.
      iii. If the only directly connected peer that has a MLAG group port active happens to be reachable through a Red ISC (i.e. the other peer has its group port as down/inactive), then that peer is chosen
      iv. If both directly connected peers have their MLAG group ports to be down/blocked, the a peer reachable through the Green ISC is chosen anyways (again tie-breaking could apply if the switch is connected to two Green ISCs)
      v. Note: There should never be a case where a switch is connected to both peers over Red ISCs—the switch should be connected to at least one Green ISC assuming at least one ISC is up.
   b. Once the peer is chosen based on the above criteria,
      i. if redirection is enabled, a redirection ACL is configured to redirect traffic destined to the failed MLAG port to the ISC that connects to that peer. No changes are made to FDB entries pointing to the failed MLAG port
      ii. if redirection is disabled, the FDB entries that point to the failed MLAG port are reprogrammed to point to the ISC that connects to that peer.
5. If the failed local port happens to be an ISC port,
   a. If the other ISC is active and is marked Red, then the switch marks that ISC as Green
      iii. If redirection is enabled, then all redirection ACLs that redirect traffic to the failed ISC is reprogrammed to redirect traffic to the active ISC
      iv. If redirection is disabled, then all FDB entries that point to the failed ISC are made to point to the active ISC.
   b. For all MLAG failed group ports on the peer that is connected to the remaining active ISC, this switch blocks its local MLAG group ports
   c. If the other ISC is also in failed state—all active MLAG ports are blocked. No other action is required.
When the switch determines that a non-local port fails:
6. If the failed port happens to be MLAG port on a directly connected peer a. This switch determines if it will be the "chosen" peer (based on step #4 being executed on the peer node)
b. If the switch determines it would end up being the chosen peer and if Local MLAG group port is active, unblock the ISC→MLAG group port traffic
c. If there is an existing ISC failure on the other ISC (not the ISC that connects to the switch whose MLAG port failed), then execute step #5b.
7. If the failed port happens to be an ISC on a directly connected peer
a. This switch marks both its ISCs as Green
b. For local MLAG ports that were already in failed state, repeat step #4 to determine new redirection action.

Although in the examples illustrated above in FIGS. 5-15, packet forwarding rules for a 4-node MLAG are illustrated, the subject matter described herein is applicable to an n-node MLAG where n is an integer greater than 2. For example, in the case of a single node failure as described above, the subject matter described herein provides example forwarding rules for a 3-node MLAG. In addition, the number of MLAG nodes supported can be extended to a number greater than 4 by designating more than two types of interswitch connections and implementing packet forwarding rules for the various interswitch connections of different types using the principles described herein.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for providing at least one node of an n-node multi-switch link aggregation groups (MLAGs), the system comprising:
   a packet forwarding device for receiving a packet destined for at least one n-node MLAG, n being an integer greater than two, the packet forwarding device including:
      a packet forwarding database for storing packet forwarding rules for the at least one n-node MLAG; and
      a processing element for forwarding, blocking forwarding of, or redirecting the packet in accordance with the packet forwarding rules in packet forwarding database; and
   an MLAG module for updating the packet forwarding rules in the packet forwarding database in response to changes in status of the n-node MLAG or an interswitch connection (ISC) that carries packets between nodes in the n-node MLAG.

2. The system of claim 1 wherein, in response to a single interswitch connection (ISC) failure and no MLAG failures, the packet forwarding device is configured to allow packets to be forwarded to all ports on the packet forwarding device associated with the at least one n-node MLAG so that the at least one n-node MLAG can operate at full bandwidth.

3. The system of claim 1 wherein, in response to failure of a single MLAG port of the packet forwarding device associated with the at least one n-node MLAG and no interswitch connection failures, the packet forwarding device is configured to redirect packets destined for the failed MLAG port to an alternate MLAG port.

4. The system of claim 1 wherein the packet forwarding device is configured to utilize a topology discovery protocol to discover connections with other packet forwarding devices associated with the at least one n-node MLAG and to automatically configure at least a portion of the packet forwarding database based on the discovered connections.

5. The system of claim 1 wherein the packet forwarding device is configured to utilize a protocol for automatically detecting events that trigger updates to the packet forwarding rules for the at least one n-node MLAG.

6. The system of claim 1 wherein the packet forwarding device includes first and second ports for respectively connecting to first and second interswitch connections (ISCs) and wherein the packet forwarding database includes the following rules when all MLAG ports and ISC ports associated with all of the packet forwarding devices in the n-node MLAG are operational, and wherein the packet forwarding devices in the n-node MLAG are connected to each other via the ISCs in a ring topology:
   (1) all layer 2 traffic received on either of the first and second interswitch connections is blocked from being forwarded to an MLAG port; and
   (2) layer 2 traffic received on the first interswitch connection is prevented from being forwarded on the second interswitch connection.

7. The system of claim 6 wherein, in response to failure of a single MLAG port, the packet forwarding device is configured to:
   if the single failed MLAG port is on a node adjacent to the packet forwarding device, modify rule (1) to unblock forwarding of traffic received on the second interswitch connection to a peer MLAG port of the failed MLAG port; and
   if the single failed MLAG port is on the packet forwarding device, add the following rule to the packet forwarding database:
   unicast traffic destined for the failed MLAG port is redirected to the second interswitch connection.

8. The system of claim 6 wherein, in response to failure of two non-adjacent ports within a single MLAG, the packet forwarding device is configured to:
   if the packet forwarding device is adjacent to one of the failures, modify rule (1) unblock of forwarding traffic received on the second interswitch connection to peer a MLAG port of the failed MLAG ports; and
   if one of the failed ports is on the packet forwarding device, add the following rule to the packet forwarding database:
   (3) unicast traffic destined for the failed MLAG port is redirected to the second interswitch connection.

9. The system of claim 6 wherein, in response to failure of two adjacent ports within a single MLAG, the packet forwarding device is configured to:
   if the packet forwarding device is adjacent to the failure, modify rule (1) to unblock forwarding of traffic received on the first interswitch connection to a peer MLAG port of the failed MLAG ports; and
   if one of the failed ports is on the packet forwarding device, to add the following rule to the n-node MLAG forwarding rules database:
   (3) unicast traffic destined for the failed MLAG port is redirected to the first interswitch connection if the first interswitch connection of the first type is unblocked and otherwise, unicast traffic is redirected to the second interswitch connection.

10. The system of claim 6 wherein, in response to failure of three ports within the same MLAG, the packet forwarding device is configured to, if none of the MLAG ports on the packet forwarding device has a failure, modify rule (1) to unblock forwarding of traffic from the first interswitch connection to the MLAG port.

11. The system of claim 6 wherein, in response to a single interswitch connection failure, the packet forwarding device is configured to unblock forwarding of traffic between the first and second interswitch connections.

12. The system of claim 11 wherein, in response to failure of an MLAG port on a node connected to the failed interswitch connection and adjacent to the packet forwarding, the packet forwarding device is configured to unblock ISC to MLAG port forwarding.

13. The system of claim 11 wherein, in response to failure of an MLAG port on a node not connected to the failed interswitch connection and adjacent to the packet forwarding device, and wherein the packet forwarding devices is not connected to the failed interswitch connection, the packet forwarding device is configured to unblock ISC to MLAG port forwarding and wherein the system further comprises a packet forwarding device connected to the failed interswitch connection and the node on which the MLAG port failure occurred, which is configured to disable the corresponding MLAG port.

14. The system of claim 1 wherein the packet forwarding device is configured to connect to other packet forwarding devices in the n-node MLAG via interswitch connections to form a linear topology.

15. A method for providing at least one node of an n-node multi-switch link aggregation groups (MLAGs), the method comprising:
in a packet forwarding device:
receiving a packet destined for at least one n-node MLAG, n being an integer greater than 2;
providing a packet forwarding database for storing packet forwarding rules for the at least one n-node MLAG;
controlling a processing element to forward, block forwarding of, or redirect the packet in accordance with the packet forwarding rules in the packet forwarding database; and
providing an MLAG module for updating the packet forwarding rules in the packet forwarding database in response to changes in status of the n-node MLAG or an interswitch connection (ISC) that carries packets between nodes in the n-node MLAG.

16. The method of claim 15 comprising, in response to a single interswitch connection (ISC) failure and no MLAG failures, allowing packets to be forwarded to all MLAG ports of the packet forwarding device associated with the at least one n-node MLAG so that the at least one n-node MLAG can operate at full bandwidth.

17. The method of claim 15 comprising, in response to failure of a single MLAG port of the packet forwarding device associated with the at least one n-node MLAG and no interswitch connection failures, redirecting packets destined for the failed MLAG port to an alternate MLAG port.

18. The method of claim 15 comprising utilizing a topology discovery protocol to discover connections between the packet forwarding device and other packet forwarding devices associated with the at least one n-node MLAG and automatically configuring at least a portion of the packet forwarding database based on the discovered connections.

19. The method of claim 15 comprising utilizing a protocol for automatically detecting events that trigger updates to the MLAG packet forwarding rules.

20. The method of claim 15 wherein the packet forwarding device includes first and second ports for respectively connecting to first and second interswitch connections (ISCs) of and wherein the packet forwarding database includes the following rules when all MLAG ports and ISC ports associated with all of the packet forwarding devices in the n-node MLAG are operational and wherein the packet forwarding devices in the n-node MLAG are connected to each other via the ISCs in a ring topology:
(1) all layer 2 traffic received on either of the first and second interswitch connections is blocked from being forwarded to an MLAG port; and
(2) layer 2 traffic received on the first interswitch connection is prevented from being forwarded on the second interswitch connection.

21. The method of claim 20 comprising, in response to failure of a single MLAG port:
if the single failed MLAG port is on a node adjacent to the packet forwarding device, modifying rule (1) to unblock forwarding of traffic received on the second interswitch connection to a peer MLAG port of the failed MLAG port; and
if the single failed MLAG port is on the packet forwarding device, adding the following rule to the packet forwarding database:
(3) unicast traffic destined for the failed MLAG port is redirected to the second interswitch connection.

22. The method of claim 20 comprising, in response to failure of two non-adjacent ports within a single MLAG:
if the packet forwarding device is adjacent to one of the failures, modifying rule (1) to unblock forwarding of traffic received on the second interswitch connection to a peer MLAG port of the failed MLAG ports; and
if one of the failed ports is on the packet forwarding device, adding the following rule to the packet forwarding database:
(3) unicast traffic destined for the failed MLAG port is redirected to the second interswitch connection.

23. The method of claim 20 comprising, in response to failure of two adjacent ports within a single MLAG:
if the packet forwarding device is adjacent to the failure, modifying rule (1) to forward traffic received on the first interswitch connection; and
if one of the failed ports is on the packet forwarding device, to adding the following rule to the n-node MLAG forwarding rules database:
(3) unicast traffic destined for the failed MLAG port is redirected to the first interswitch connection if the first interswitch connection of the first type is unblocked and otherwise, unicast traffic is redirected to the second interswitch connection.

24. The method of claim 20 comprising, in response to failure of three ports within the same MLAG, if none of the MLAG ports on the packet forwarding device has a failure, modifying rule (1) to unblock forwarding of traffic from the first interswitch connection to the MLAG port.

25. The method of claim 20 comprising, in response to a single interswitch connection failure, unblocking forwarding of traffic between the first and second interswitch connections.

26. The method of claim 25 wherein, in response to failure of an MLAG port on a node connected to the failed interswitch connection and adjacent to the packet forwarding device, unblocking ISC to MLAG port forwarding.

27. The method of claim 25 wherein, in response to failure of an MLAG port on a node not connected to the failed interswitch connection and adjacent to the packet forwarding device, and wherein the packet forwarding device is not connected to the failed interswitch connection, unblocking ISC to MLAG port forwarding and a packet forwarding device connected to the failed interswitch connection and the node on which the MLAG port failure occurred is configured to disable the corresponding MLAG port on the packet forwarding device.

28. The method of claim 15 wherein the packet forwarding device is configured to connect to other packet forwarding devices in the n-node MLAG via interswitch connections to form a linear topology.

29. A non-transitory computer readable medium having stored thereon executable instructions that when executed by the processor of a computer control the computer to perform steps comprising:
   in a packet forwarding device:
      receiving a packet destined for at least one n-node multi-switch link aggregation group (MLAG),
      providing a packet forwarding database for storing packet forwarding rules for the at least one n-node MLAG;
      controlling processing element to forward, block forwarding of, or redirect the packet in accordance with the packet forwarding rules in the packet forwarding database; and
      providing an MLAG module for updating the packet forwarding rules in the packet forwarding database in response to changes in status of the n-node MLAG or an interswitch connection (ISC) that carries packets between nodes in the n-node MLAG.

* * * * *